US006577407B1

(12) United States Patent
Kopecki (10) Patent No.: US 6,577,407 B1
(45) Date of Patent: Jun. 10, 2003

(54) SECONDARY PRINTER SYSTEM

(75) Inventor: Mark Samuel Kopecki, Marlton, NJ (US)

(73) Assignee: Oki Data Americas, Inc., Mt. Laurel, NJ (US)

( * ) Notice: Subject to any disclaimer, the term of this patent is extended or adjusted under 35 U.S.C. 154(b) by 0 days.

(21) Appl. No.: 09/262,227

(22) Filed: Mar. 4, 1999

(51) Int. Cl.[7] .............................. G06F 3/12; G06F 13/00
(52) U.S. Cl. ...................................... 358/1.15; 358/1.14
(58) Field of Search ............................... 358/1.15, 1.14; 710/3, 5, 15, 20; 709/203, 321, 229–232

(56) References Cited

U.S. PATENT DOCUMENTS

| 5,140,674 A | * | 8/1992 | Anderson et al. ............ 395/111 |
| 5,179,637 A | | 1/1993 | Nardozzi .................... 358/1.15 |
| 5,247,623 A | | 9/1993 | Sun ............................ 710/106 |
| 5,287,194 A | | 2/1994 | Lobiondo ................... 358/296 |
| 5,467,434 A | | 11/1995 | Hower, Jr. et al. ......... 358/1.15 |
| 5,559,933 A | | 9/1996 | Boswell ...................... 358/1.16 |
| 5,647,056 A | | 7/1997 | Barrett et al. ............... 709/220 |
| 5,720,015 A | | 2/1998 | Martin et al. .............. 358/1.15 |
| 5,768,516 A | | 6/1998 | Sugishima ................... 709/217 |
| 5,895,155 A | * | 4/1999 | Narita et al. .................. 400/61 |
| 6,031,631 A | * | 2/2000 | Tahara et al. ............... 358/296 |
| 6,070,000 A | * | 5/2000 | Mori ........................... 395/114 |
| 6,081,342 A | * | 6/2000 | Nakai et al. ................ 358/1.16 |
| 6,369,909 B1 | * | 4/2002 | Shima ........................ 358/1.15 |

OTHER PUBLICATIONS

Inmac, vol. 182a, advertisement, 6 pages.

* cited by examiner

Primary Examiner—Gabriel Garcia
Assistant Examiner—Douglas Tran
(74) Attorney, Agent, or Firm—Akin, Gump, Strauss, Hauer & Feld, L.L.P.

(57) ABSTRACT

A printer system for printing data from a network device connected to a network connection system is disclosed. The printer system includes a primary printer coupled to the network connection system by a network interface unit and one or more secondary printers coupled to the primary printer by a non-network interface unit. The primary printer routes data received from the network connection system to the primary printer or to the secondary printers for printing, making the secondary printers appear to a user of the network device to be directly connected to the network connection system.

17 Claims, 4 Drawing Sheets

FIG. 6

SECONDARY PRINTER SYSTEM

BACKGROUND OF THE INVENTION

The present invention relates generally to a plurality of printers connected to a computer network and more particularly a printer system for connecting a secondary printer to a network by connection to a primary printer.

Office data processing environments typically have a large number of computer users and a lesser number of printers to which the users require access. The most desirable architecture for configuring users and printers is one in which an arbitrary number of users may have access to any desired printer in order to provide the most efficient and economical use of the printer resources.

Commercial networking products are available for coupling together a plurality of computers with peripheral devices such as printers to provide the desired communication flexibility and sharing of printer resources. Examples of network connection systems for interconnecting computers and printers include token ring networks conforming to IEEE Std. 802.5 with interconnection speeds up to 16 Megabits per second, and networks based on Ethernet technology conforming to IEEE Std 802.3, with interconnection speeds up to 100 Megabits per second. Typically printers (and other devices) employ network interface units (NIU) for connecting to the network connection system. Because of the high speed of data transmission on the network interconnection system and the complexity of the data protocols for operating with the network, the cost of NIUs for attaching printers to a network is significantly higher than the cost of point-to-point interface units dedicating a printer to a specific computer.

Efficient use of printers on a network also requires a print manager. The print manager is typically a separate computer attached to the network connection system. By receiving all print jobs prior to transmission to a designated printer, the print manager mediates the print jobs originating from multiple network devices attempting to simultaneously access the same printer. The print manager also provides storage for the printer data and queues the print jobs for processing by the designated printer in accordance with the printer's printing and data storage capacity. Since generally, printers have only a limited memory capacity, many print jobs require repeated access to the print manager for transfer of the entire print job to the printer. This is inefficient because of complex network protocols having to be repeatedly executed and the sharing of the network connection system with other data being transferred.

In the case of printers, the rate at which data can be printed on an individual printer is generally small compared to the capacity of the network interface unit for transferring data from the network connection system to the printer. Thus, a typical network interface unit has the capacity to support a multiplicity of printers.

It would be desirable to be able to functionally connect multiple printers to a network without requiring each printer to have a dedicated network interface unit. Further, it would be desirable if each printer did not require the complex software to support high level printer languages and the extensive memory required to efficiently print large print jobs.

A recent development is stand-alone print server devices, such as the Hewlett Packard DEP1233, which provides the capability of connecting up to three printers having point-to-point interfaces to a single physical point on a network. However, while stand alone print servers allow non network-compatible printers to be attached to a network, stand-alone print servers do not reduce the complexity in the printer software or relax printer memory requirements.

The present invention is directed to a primary printer having a network interface and capable of supporting one or more non-network compatible secondary printers connected to the primary printer such that each secondary printer appears to a user to be directly connected to the network. Significant savings in secondary printer hardware and software costs are achievable by incorporating functions normally replicated in each secondary printer into the primary printer and utilizing a simple point-to-point data communication interface between the primary printer and each secondary printer. The primary printer may also function as a print manager for the attached secondary printers by simple addition of a mass storage device. Cost savings in the network are possible because of the reduced number of network hardware nodes.

BRIEF SUMMARY OF THE INVENTION

Briefly stated the present invention is a printer system for printing data from a network device connected to a network connection system. The printer system comprises a primary printer coupled to the network connection system by a network interface unit and a secondary printer coupled to the primary printer by a secondary non-network interface unit. The primary printer routes the data received from the network connection system to one of the primary printer and the secondary printer for printing, making the secondary printer appear to a user of the network device to be directly connected to the network connection system.

The present invention further comprises a primary printer connected to a network connection system for printing data from a network device connected to the network connection system and for providing the data to a secondary printer. The primary printer comprises a network interface unit for receiving and transmitting the data from the network device and outputting status data to the network device representative of the status of the primary printer and the secondary printer. The primary printer also includes a primary print engine, a processor for receiving the data transmitted from the network interface unit and for transmitting the data to one of the primary print engine and the secondary printer and a primary non-network interface connected between the processor and the secondary printer, for providing data to the secondary printer when designated by the processor and for receiving status data from the secondary printer. The secondary printer appears to a user of the network device to be directly connected to the network connection system.

The present invention further comprises a secondary printer for connection to a primary printer. The secondary printer comprises a secondary non-network interface unit for receiving and transmitting non-printer specific data received from the primary printer and for outputting status data to the primary printer, a processor connected to the secondary non-network interface for translating the non-printer specific data to print engine compatible data and a secondary print engine for receiving the print engine compatible data from the processor and for printing the print engine compatible data.

The present invention further comprises a method for printing data from one or more network devices connected to a network connection system on a primary printer connected to the network connection system and a secondary printer connected to the primary printer. The method includes receiving a print job request by the primary printer from the network device, receiving the data in the primary printer connected to the network connection system, transmitting the data to either a primary print engine or the secondary printer and printing the data in either the primary printer or the secondary printer.

The present invention further comprises a method for determining an operational status of a secondary printer by a network device connected to the network connection system in which the secondary printer is connected to the network connection system by a primary printer. The method includes the steps of transmitting a status request from the network device to the primary printer, receiving the status request in the primary printer and responding to the network device with status data representative of the operational status of the secondary printer.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

In the drawings, like numerals are used to indicate like elements throughout. It should also be understood that the articles "a" or "the" used in the claims to define an element may refer to a single element or to a plurality of elements without a limit as to the number elements.

Figure 1:
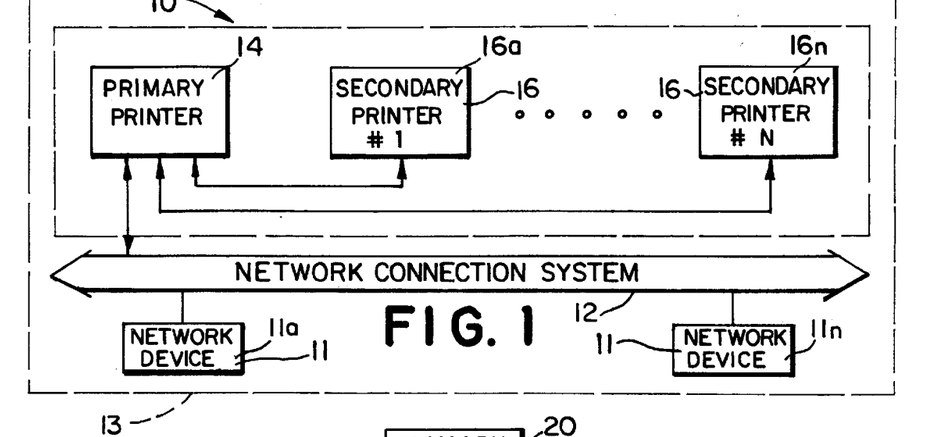
FIG. 1 is a functional schematic block diagram of a printer system in accordance with a preferred embodiment of the present invention.

Referring now to FIG. 1 there is shown a printer system 10 for printing data from any one of a plurality of network devices 11a, 11n, (hereinafter referred to as network devices 11), connected to a network connection system 12 comprising a primary printer 14 and a plurality of secondary printers 16a, 16n, (hereinafter referred to as secondary printers 16). The secondary printers 16 may be unmodified, commercially available printers with standard serial or parallel point-to-point data communication interfaces or may be specially constructed to optimize the operation of the printer system 10 as hereinafter discussed. The primary printer 14, and network devices 11 as well as other devices (not shown) are physically attached to a network connection system 12 which, in concert with software disposed in the attached devices, allows the network devices 11 and primary printer 14 to exchange information. The summation of the network connection system 12 and all the devices attached directly or indirectly to the network connection system 12 which are capable of interchanging information comprise a network 13.

In the preferred embodiment of the printer system 10, the network devices 11 are computers operating functionally as user workstations, network management stations and print managers. The network devices 11 transmit printer data, print commands and requests for status to the primary printer 14 and receive status data from the primary printer 14. As will be appreciated by one skilled in the art, the network devices 11 may be any one of commercially available personal or mainframe computers and need not be described in detail for a full understanding of the invention.

In the preferred embodiment of the printer system 10, the network connection system 12 is a 100BaseT local area network compliant with IEEE Std. 802.3. A suitable network connection system 12 is the Model No. 3C16610 Superstack II manufactured by 3Com, Inc. However, the printer system 10 is not limited to using a 100BaseT local area network for establishing connectivity between the network components. As will be appreciated by those skilled in the art, other types of local area networks, such as a token ring network compatible with IEEE 802.5, may be used as the network connection system 12 without departing from the spirit and scope of the invention. Further, the present invention may be employed with wide area networks and metropolitan area networks and still be within the spirit and scope of the invention. The principles by which data is transferred between devices attached to the network connection system 12 are well known to those skilled in the art and need not be repeated for a full understanding of the invention.

Figure 2:
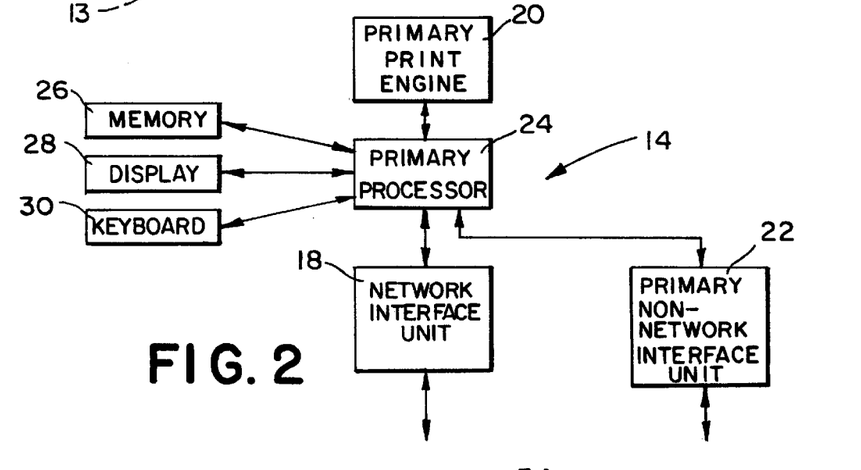
FIG. 2 is a more detailed functional schematic block diagram of a primary printer portion of the printer system as shown in FIG. 1.
Figure 4:
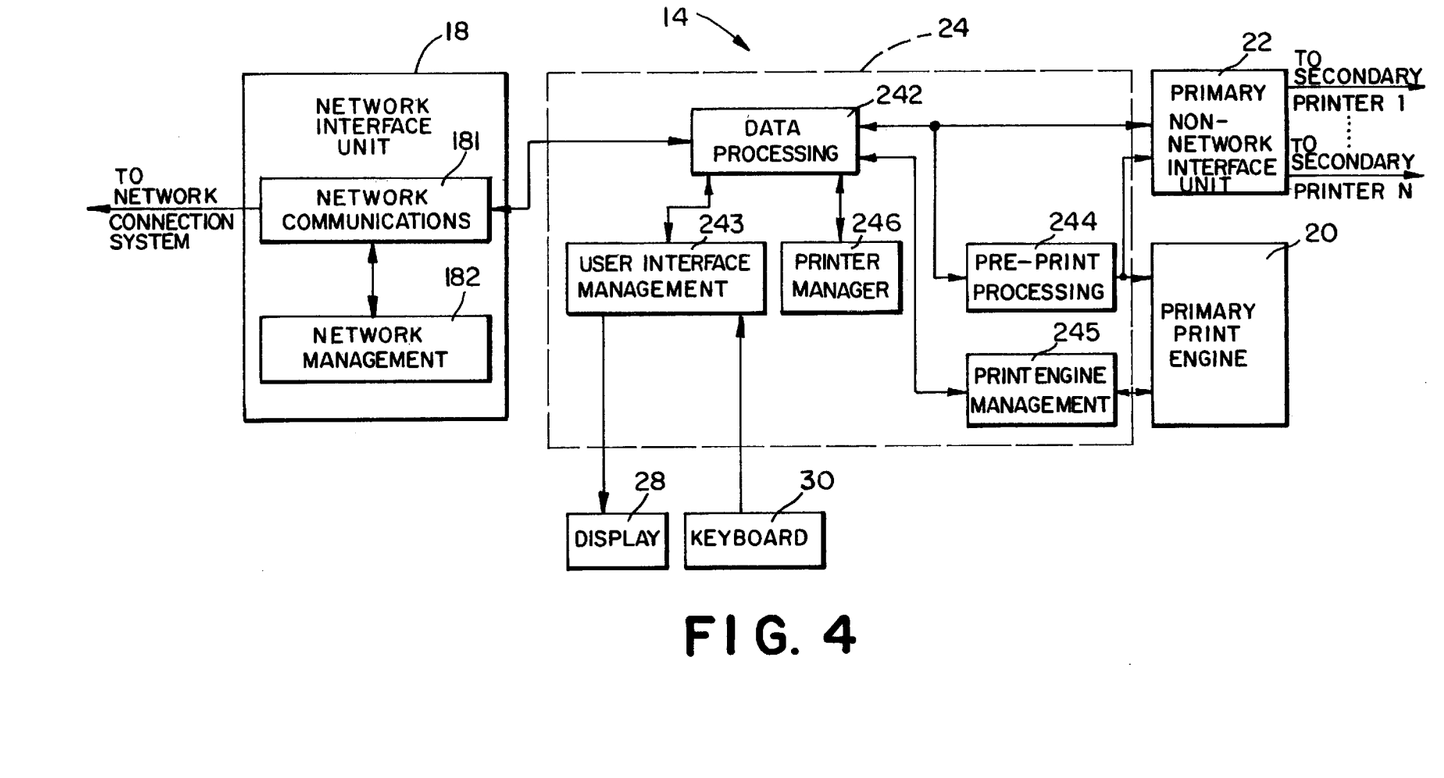
FIG. 4 is a more detailed functional schematic block diagram of functions performed by the primary printer shown in FIG. 2.

Referring now to FIGS. 2 and 4, there is shown a primary printer 14 connected the network connection system 12 for printing printer data from a network device 11 connected to the network connection system 12 and for providing the printer data to a secondary printer 16. The primary printer 14 is connected to the network connection system 12 by a network interface unit (NIU) 18. In the preferred embodiment, the network interface unit 18 comprises hardware and software including a network communications function 181 for receiving printer data and print commands from a network device 11 and for transmitting the printer data and print commands to a primary processor 24 preferably located in the primary printer 14. The network interface unit 18 network communications function 181 also transmits status data representative of the status of the primary printer 14 and each connected secondary printer 16, received from the primary processor 24, to a network device 11, in response to requests for status from a network device 11.

In the preferred embodiment, the network communications function software executes the physical level and data link layer protocols that interface the network interface unit 18 to the network connection system 12 and converts the serial signals on the 100BaseT local area network connection system 12 to the parallel data format used by the primary processor 24. The network communications function 181 also executes the transport layer and network layer protocols required for establishing reliable communications between the primary printer 14 and the network devices 11.

In the preferred embodiment of the primary printer 14, the transport layer and network layer protocols are selected from the suite of Transport Control Protocols and Internet Protocols (TCP/IP) developed by the U.S. Department of Defense. However, other network protocols, such as SPX/IPX developed by Novell could be used within the spirit and scope of the invention. In the preferred embodiment of the primary printer 14, the transport layer and network layer protocols reside in the NIU 18. However, the transport layer and network layer protocols, as understood by those skilled in the art, could also reside in the primary processor 24 and still be within the spirit and scope of the invention.

The NIU 18 also includes a network management function 182. The network management function 182 in conjunction with the data processing function 242 supports requests for status from a network device 11 acting as a network manager by responding with status data representative of the operational status of the primary printer 14 and attached secondary printers 16. In the preferred embodiment, the NIU 18 supports network management by acting as a network agent executing the Simple Network Management Protocol (SNMP) developed by the Department of Defense and available from a variety of manufacturers. However, the NIU 18 need not employ the SNMP protocol to support network management functions. As will be seen by a person skilled in the art, other network management protocols may be used for network management within the spirit and scope of the invention.

The NIU 18 also includes software that translates the network management protocol into a protocol which is more adapted to printers. In the preferred embodiment the requests for status and status data are converted from the SNMP format to Printer Job Language (PJL) format for interchange between the NIU 18 and the primary processor 24. As will be seen by those skilled in the art, the conversion from SNMP to PJL need not be performed in the NIU 18 but could be performed in the primary processor 24 within the spirit and scope of the invention.

In the preferred embodiment the NIU 18 is typically implemented by a microprocessor, associated non-volatile read only memory (ROM), volatile random access memory (RAM) and flash ROM for interfacing to the network connection system 12. However, as will be appreciated by a person skilled in the art, the NIU 18 could be implemented by other means, such as one or more custom designed LSIs. Also, the functions of the NIU 18 could be fully or partially integrated into the primary processor 24 and still be within the spirit and scope of the invention.

The preferred embodiment of the primary printer 14 also includes a primary processor 24 connected to the network interface 18 for receiving the printer data transmitted from the network interface unit 18 and transmitting the printer data to a primary print engine 20 or to a secondary printer 16. The primary processor 24 provides the functions of data processing 242, user interface management 243, print engine management 245 and pre-print processing 244. The data processing function 242 interprets printer data received from the network communication function 181 to properly route printer data to the primary print engine 20 or to a secondary printer 16. In the preferred embodiment, the print command designates the specific printer 14, 16 to which the print job is to be routed. Alternatively, the data processing function 242 may incorporate logic to route the printer data to the primary printer 14 or to a secondary printer 16 based upon the busy/non-busy status or in-service/out-of service status of the designated printer 14, 16. Various logical algorithms to optimize the use of printer resources and which may or may not involve the user by feedback to a network device 11 may be implemented in the data processing function 242 and are within the scope of the invention. The data processing function 242 operating in conjunction with the network communication function 181 makes a secondary printer 16 appear to a user to be directly connected to the network connection system 12.

The data processing function 242 also supports network management. In the preferred embodiment requests for status received from the NIU 18 are processed and forwarded to the primary printer 14 print engine management function 245 and/or to the secondary printers 16 using PJL protocol. Each printer 14, 16 responds with an operational status which typically would include indications such as "busy", "out of paper", "out of toner", "out of service" etc. As will be appreciated by one skilled in the art, the extension of network management to each printer need not be accomplished using PJL protocols. Other protocols, including SNMP may be used, within the spirit and scope of the invention.

The data processing function 242 also translates the printer data transmitted by the network device 11 and formatted in a high level printer language such as Adobe Postscript™ or PCL™ into an intermediate format which is non-printer-specific. The non-printer-specific format has the characteristic of being relatively simple to translate into a print engine compatible format, thus allowing a reduction in the complexity of each secondary printer 16 hardware and software. In the case where the secondary printer 16 designated for printing the printer data is a commercial, unmodified printer, the printer data is not translated into the non-printer-specific format since the commercial unmodified printer 16 would not have the capability for translating the non-printer-specific format to the print engine compatible format. The translated (or untranslated) printer data is stored by the data processing function 242 in the primary printer memory 26 until the designated printer 14, 16 is available for printing.

The preferred embodiment of the primary processor 24 also includes a pre-print processing function 244 and a print engine management function 245 which interface the primary processor 24 to the primary print engine 20. The pre-print processing function 244 translates the printer data designated for printing on the primary printer 14 and formatted in the non-printer-specific format into a primary print engine 20 compatible data format which can be directly printed by the primary print engine 20. The pre-print processing function 244 also performs data compression on the non-printer-specific printer data designated for a secondary printer 16 having the requisite decompression function. In the preferred embodiment of the printing system 10, the Lempel-Ziv algorithm is used for data compression. However, as will be appreciated by those skilled in the art, other compression techniques including the discrete cosine transform and Huffman coding could be used, within the spirit and scope of the invention. The processor 24 also includes a print engine management function 245 which controls the operation of print head mechanisms and paper handling mechanisms and also supports status reporting of primary print engine 20 functions. Print engine functions are well known to those skilled in the art and do not need to be described for a full understanding of the invention The primary printer 14 also includes a primary print engine 20. In the preferred embodiment, the primary print engine 20 is an electrographic printer employing a light emitting diode (LED) print head, an electrosensitive drum and associated charging, developing, fusing and paper handling mechanisms. However, the primary print engine 20 is not limited to being an electrographic printer but could be, for example, an impact printer, an ink jet printer or the like and be within the spirit and scope of the invention. Print engines are well known in the art and need not be described in detail for a full understanding of the invention.

The primary processor 24 also includes a user interface management function 243 that supports a primary printer 14 user interface comprising a keyboard 30 and display 28. In the preferred embodiment, the keyboard 30 and display 28 are respectively push button switches and LCDs. However, a person skilled in the art will recognize that the user interface is not limited to push buttons and LCDs. Other user interfaces such as flat panel displays could be used and still be within the spirit and scope of the invention.

The preferred embodiment of the primary printer 14 also includes a print manager function 246 in which the printer data designated for the primary printer 14 and secondary printers 16 are temporarily stored. The print manager function 246 queues the printer data for transmission to the primary print engine 20 or to a designated secondary printer 16 in accordance with the rate at which the print job can be printed in the designated printer 14, 16 order to minimize memory size requirements in the secondary printers 16. The print manager function 246 also responds to printer resource management algorithms that mediate print job access from multiple users to a specific printer 14, 16.

In the preferred embodiment of the primary printer 14 the primary processor 24 is of conventional design incorporating a microprocessor central processing unit (CPU), interface logic and a memory 26 comprising a variety of commercially available memory components including electronically erasable programmable read only memory (EEPROM), non-volatile read only memory (ROM) and flash ROM, volatile random access memory (RAM) and a hard disk. The implementation of the primary processor 24 and memory 26 is well known to those skilled in the art and need not be explained in detail for a full understanding of the invention.

Referring to FIGS. 2 and 4, the preferred embodiment of the primary printer 14 also includes a primary non-network interface unit 22 connected between the primary processor 24 and the secondary printers 16 for providing printer data, print commands and requests for status to the secondary printers 16 when designated by the primary processor 24 and for receiving status data from the secondary printers 16. In the preferred embodiment of the primary printer 14, the non-network interface unit 22 provides two parallel and one serial bidirectional point-to-point data interfaces compatible with IEEE-1284 for dedicated communication with each secondary printer 16. The primary non-network interface unit 22 is not limited to the data communication protocols conforming to IEEE-1284 or to any particular number of point-to-point interfaces. For example the primary non-network interface unit 22 may be a Small Computer System Interface (SCSI) or a Universal Serial Bus (LJSB), both of which support a virtually unlimited number of devices, and still be within the spirit and scope of the invention. Further, the primary non-network interface unit 22 may simultaneously support a plurality of different data communications protocols where, for instance, each secondary printer 16 has a different type of non-network interface unit 32.

Figure 3:
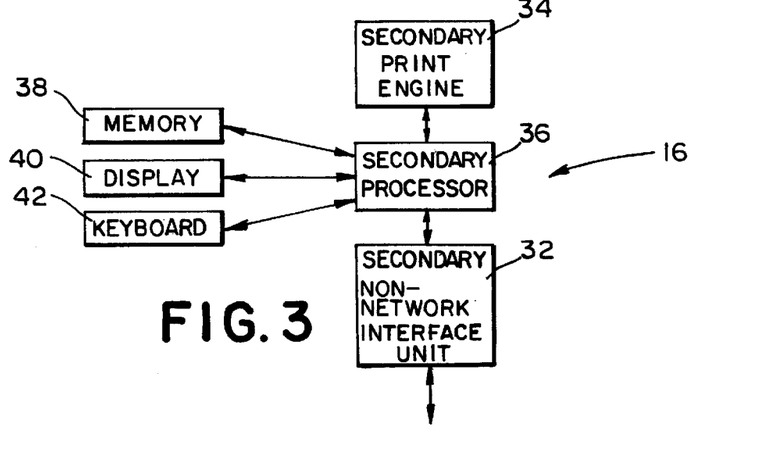
FIG. 3 is a more detailed functional schematic block diagram of a secondary printer portion of the printer system as shown in FIG. 1.
Figure 5:
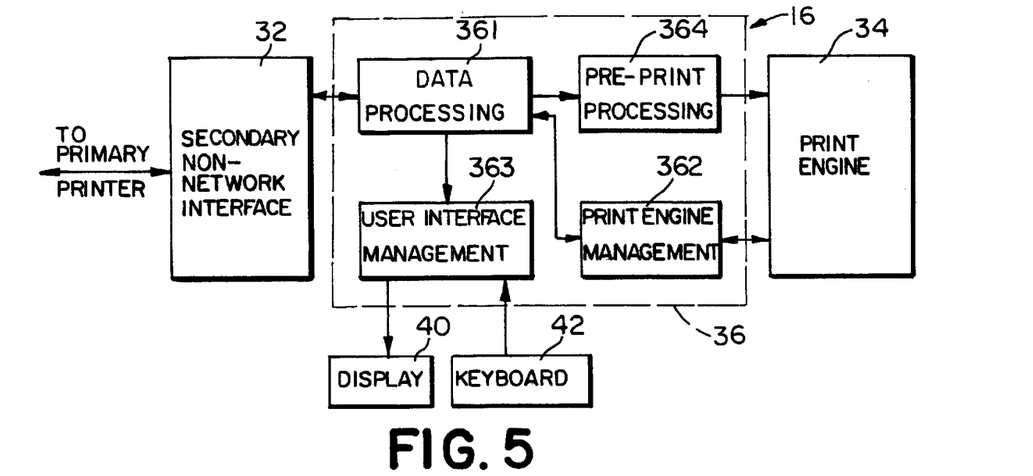
FIG. 5 is a more detailed functional schematic block diagram of functions performed by the secondary printer shown in FIG. 3.

Referring now to FIGS. 3 and 5 there is shown a secondary printer 16 for connection to a primary printer 14. The secondary printer 16 may be a conventional, commercially available non-network type of printer having a point-to-point data communications interface, in which case the primary printer 14 supports the secondary printer 16 with compatible (standard) data communication protocols between the primary non-network interface 22 and a secondary non-network interface unit 32 and with compatible printer data formats such that the secondary printer 16 appears to be directly connected to the network connection system 12. However, in the preferred embodiment of the printer system 10, the secondary printer 16 is constructed to take advantage of the network communications 181, data processing 242 and pre-print processing 244 functions incorporated into the primary printer 14 specifically for enhancing the performance and reducing the complexity of the secondary printer 16 as described below.

In the preferred embodiment of the printer system 10 there is a secondary non-network interface unit 32 for receiving non-printer-specific printer data from the primary printer 14 and transmitting status data to the primary printer 14. The printer data, received by the secondary printer 16 may be compressed or not compressed, depending upon the particular configuration of the secondary printer 16. The secondary non-network interface unit 32 and the primary non-network interface unit 22 are selected to be compatible with one another and may be chosen from any one of a variety of point-to-point or other types of data communication interface types as will be appreciated by those skilled in the art.

The preferred embodiment of the secondary printer 16 also includes a secondary processor 36 connected to the secondary non-network interface unit 32 for receiving the non-printer-specific printer data and translating the non-printer-specific printer data to print engine compatible printer data. The secondary processor 36 provides the functions of data processing 361, pre-print processing 364, user interface management 363 and print engine management 362. The data processing function 361 receives the printer data, print commands and requests for status from the secondary non-network interface unit 32. Print commands and requests for status are routed to the print engine management function 362 for control of the secondary print engine 34 and determination of the status of the secondary print engine 34 respectively. The secondary print engine 34 status information is received by the data processing function 361 and is transmitted back to the primary printer 14. Printer data is routed to the pre-print processing function 364 for decompression of compressed printer data prior to translation of the printer data into a print engine compatible format. The preferred embodiment of the secondary printer 16 also includes a secondary memory 38 comprising electronically erasable programmable read only memory (EEPROM), non-volatile read only memory (ROM) and flash ROM, and volatile random access memory (RAM). The implementation of the secondary processor 36 and secondary memory 38 is well known to those skilled in the art and need not be explained in detail for a full understanding of the invention.

The secondary printer 16 also includes a secondary print engine 34 for receiving and printing the print engine compatible data received from the secondary processor 36, a display 40 and a keyboard 42. The secondary print engine 34, display 40 and keyboard 42 are of conventional design and are well understood by those skilled in the art, and thus need not be further discussed for a full understanding of the invention.

Figure 6:
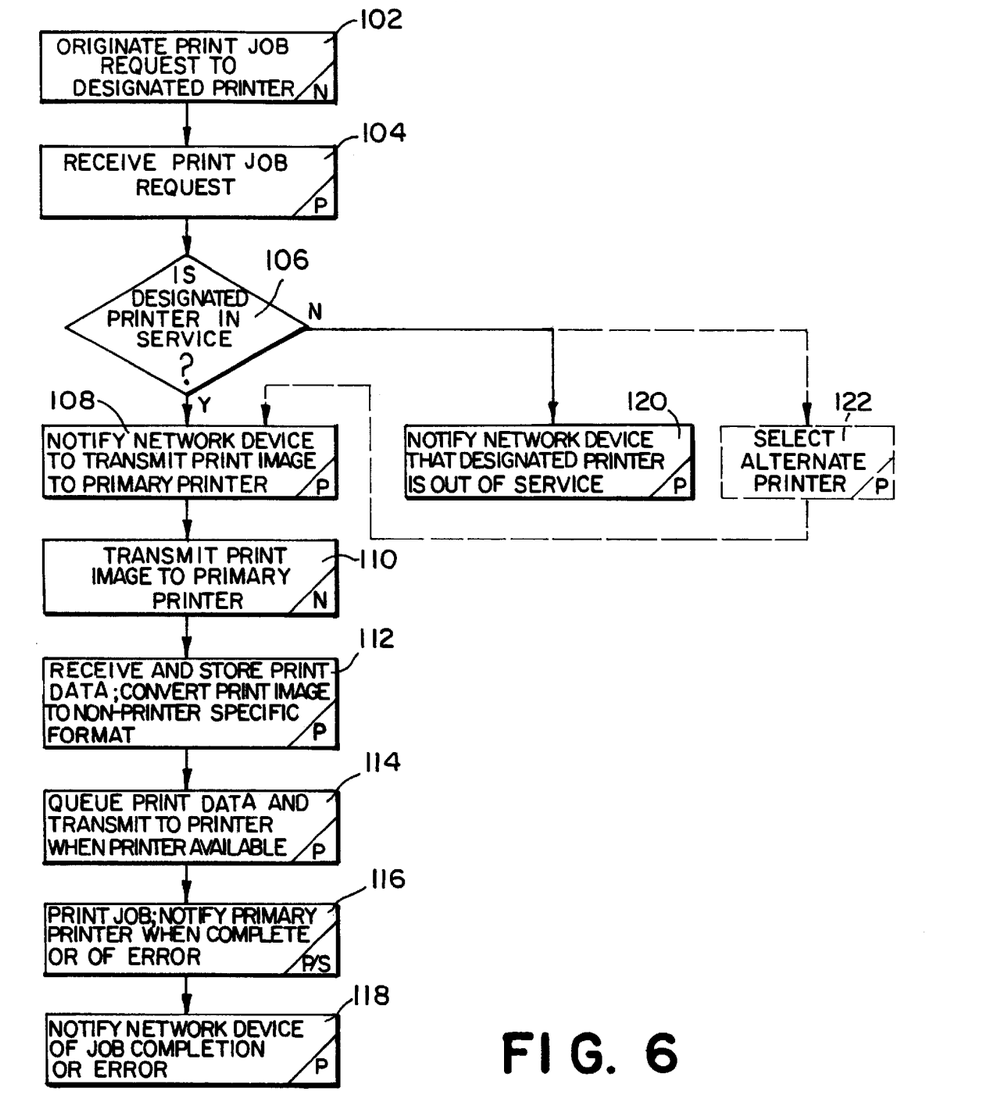
FIG. 6 is a functional flow diagram illustrating the transfer of data from the network device to the primary printer and the secondary printer.

Referring now to FIG. 6 there is shown the flow of a print job from a network device 11 to a primary printer 14 or a secondary printer 16 as processed by the preferred embodiment of the printer system 10. A print job is initially formed in the network device 11 and converted to a print format containing embedded print commands by a driver routine in the network device 11. The driver routine in the network device 11 then originates a print job request (block 102) to a printer 14, 16 designated either by the network device 11 user or as a network device 11 default. The print job request is then broadcast over the network connection system 12. Every device connected to the network connection system 12 decodes the address field of the print job request. The primary printer network interface unit 18 maintains a set of addresses corresponding to the primary printer 14 and each secondary printer 16 attached to the primary printer 14. If the primary printer 14 recognizes the address in the print job request, the print job request is received by the primary printer 14 (block 104). The primary printer 14 then determines if the printer 14, 16 designated in the print job request is in service (block 106). If the designated printer is in service, the primary printer 14 notifies the network device 11 to transmit the printer data to the primary printer 14 (block 108). The network device 11 then transmits the printer data to the primary printer 14 (block 110) where it is received and temporarily stored (block 112). In the preferred embodiment, the printer data is translated to a non-printer specific format (block 112) and queued for transmission to the designated primary 14 or secondary printer 16 (block 114). (If the secondary printer is a "conventional" printer, the print image is not translated). Depending on the contents of the print job, the printer data may also be compressed prior to transmission to a secondary printer 16. When the printer data is transmitted to a secondary printer 16, the secondary printer 16 notifies the primary printer 14 when the print job is complete and/or if any errors were detected (block 116). The primary printer 14, in turn, notifies the network device 11 of the completion of the print job or of any errors that might have occurred in printing the print job on the primary printer 14 or the secondary printer 16 (block 118).

If the primary printer 14 determines that the printer 14, 16 designated in the print request is out of service (block 106), the primary printer 14 notifies the network device 11 that the print job can not be printed on the designated printer 14, 16 (block 120). The user may then select another printer. Alternatively, the primary printer 14 may be configured to automatically select a replacement printer 14, 16 (block 122).

Figure 7:
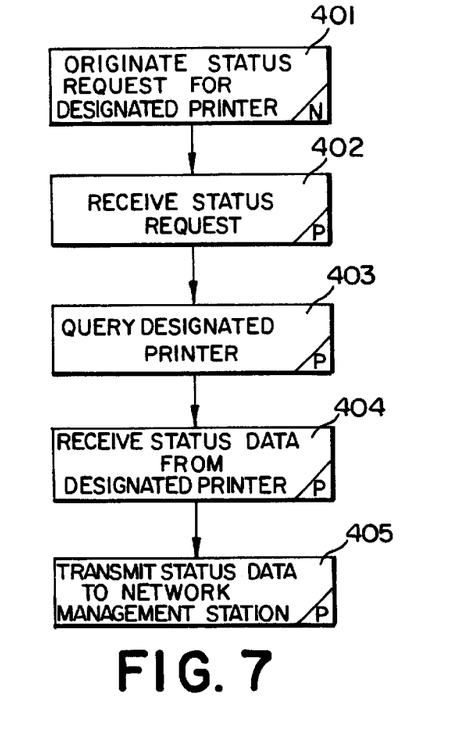
FIG. 7 is a functional flow diagram illustrating the flow of requests for status and status data between the network device, the primary printer and the secondary printer.

In the preferred embodiment, the printer system 10 also provides the status of each printer 14, 16 configured within the printer system 10 to network device 11 connected to the network connection system 12 as shown in FIG. 7. Typically, the network device 11 requesting status data is configured as a network management station. In operation, the network device 11 originates a request for the status of a designated printer by broadcasting the request for status on the network connection system 12 (block 401). If the address of the designated printer is held by the primary printer 14, the primary printer 14 receives the status request (block 402) and queries the designated printer 14, 16 (block 403). The designated printer 14, 16 then responds with status data which is received by the primary printer 14 (block 404) and forwarded to the network management station (block 405). Alternatively, the primary printer 14 could periodically pole all the secondary printers 16 for status so that when a request for status was received, the primary printer 14 could immediately respond.

It will be appreciated by those skilled in the art that changes could be made to the embodiments and operation described above without departing from the broad inventive concepts thereof. It is understood, therefore, that this invention is not limited to the particular embodiments disclosed, but it is intended to cover modifications within the spirit and scope of the present invention as defined by the appended claims.

I claim:

1. A primary printer connected to a network connection system for printing print data received from a network device connected to the network connection system and for providing the print data to one of a plurality of secondary printers, each of which is connected to and in direct communication with the primary printer for receiving the print data, the primary printer comprising:

a network interface unit for receiving the print data from the network device;

a primary print engine;

a processor for receiving the print data received from the network interface unit, and for transmitting the print data to the primary print engine or to one of the plurality of secondary printers based on a print job request originating in the network device which designates a specific one of the printers; and a primary non-network interface unit connecting the processor to each one of the plurality of secondary printers for transmitting the print data directly to the specific one of the plurality of secondary printers designated for printing by the processor.

2. The primary printer of claim 1, wherein the primary printer transmits the print data received from the network device to a predetermined one of the print engine or to one of the plurality of secondary printers for printing if the designated printer is out of service.

3. The primary printer of claim 1, wherein the primary printer includes a print manager in which the print data designated for the primary printer and each of the plurality of secondary printers is temporarily stored and thereafter transmitted therefrom to the designated printer in accordance with the rate at which the print data can be printed in the designated printer.

4. The primary printer of claim 1, wherein the processor translates the print data into an intermediate format which is non-printer specific data for transmission to the designated one of the plurality of secondary printers.

5. The primary printer of claim 4, wherein the processor compresses the non-printer specific data prior to transmitting the non-printer specific data to the designated one of the plurality of secondary printers.

6. The primary printer according to claim 1, wherein each of the plurality of secondary printers is coupled to the primary printer by a point-to-point connection.

7. The primary printer according to claim 6, wherein each of the plurality of secondary printers is directly connected to the primary printer by a separate, dedicated connection.

8. The primary printer according to claim 6, wherein each of the plurality of secondary printers is connected to the primary printer by a bus.

9. The primary printer according to claim 1, the primary non-network interface further transmitting a status query to the one of the plurality of secondary printers designated by the processor, the designated secondary printer providing status data to the primary printer in response to the status query, wherein the status data is stored in the primary printer.

10. The primary printer of claim 9, wherein the primary printer transmits the status data stored in the primary printer to the network device in response to a status request received from the network device.

11. The primary printer of claim 9, wherein the primary printer transmits the status query to the designated one of the secondary printers in response to receiving a status request from the network device, wherein the status data stored in the primary printer in response to the status query is thereafter transmitted to the network device.

12. The primary printer of claim 9, wherein the primary printer periodically polls the plurality of secondary printers for their status by periodically transmitting the status query to each of one of the plurality of secondary printers.

13. A secondary printer for connection to a primary printer, the secondary printer comprising:
- a secondary non-network interface unit for receiving non-printer specific data from the primary printer and for outputting status data to the primary printer, wherein the primary printer converts print data formatted in a high-level printer language into an intermediate format which is the non-printer specific data;
- a secondary processor connected to the secondary non-network interface unit for receiving the non-printer specific data and for translating the non-printer specific data to print engine compatible data; and
- a secondary print engine for receiving the print engine compatible data from the processor and for printing the print engine compatible data.

14. The secondary printer of claim 13, wherein the primary printer compresses the non-printer specific data prior to transmitting the non-printer specific data to the secondary printer and the secondary processor decompresses the non-printer specific data compressed by the primary printer prior to translating the non-printer specific print data into print engine compatible data.

15. A method for printing print data originating from at least one network device connected to a network connection system on one of a plurality of secondary printers, wherein each one of the plurality of secondary printers receives the print data from the network connection system via a primary printer, each one of the plurality of secondary printers being in direct communication with the primary printer for receiving the print data from the primary printer and for transmitting in/out-of-service status data to the primary printer, the steps comprising:
- receiving a print job request by the primary printer from the at least one network device, the print job request designating the one of the plurality of secondary printers for printing the print data;
- determining the in/out-of-service status of the designated one of the plurality of secondary printers in response to the print job request;
- receiving the print data in the primary printer if the designated one of the secondary printers is in-service and thereafter transmitting the print data from the primary printer directly to the designated one of the plurality of secondary printers; and
- printing the print data on the designated one of the plurality of secondary printers.

16. A method for printing print data according to claim 15, further including the step of temporarily storing the print data received from the at least one network device in the primary printer prior to transmitting the print data to the designated one of the plurality of secondary printers, the print data being transmitted to the designated printer in accordance with a rate in which print data can be printed.

17. A method for printing print data according to claim 16, further including the step of forming at least one queue in the primary printer of the print data received from the at least one network device to be printed by the primary printer and the designated one of the plurality of secondary printers.

* * * * *